(12) United States Patent
Nara

(10) Patent No.: US 11,760,202 B2
(45) Date of Patent: Sep. 19, 2023

(54) VEHICLE DISPLAY DEVICE, DISPLAY CONTROL METHOD, AND STORAGE MEDIUM

(71) Applicant: HONDA MOTOR CO., LTD., Tokyo (JP)

(72) Inventor: Masaki Nara, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/678,064

(22) Filed: Feb. 23, 2022

(65) Prior Publication Data

US 2022/0305913 A1 Sep. 29, 2022

(30) Foreign Application Priority Data

Mar. 24, 2021 (JP) ................. 2021-050685

(51) Int. Cl.
*B60K 35/00* (2006.01)
*G06F 3/0482* (2013.01)
*G06F 3/0481* (2022.01)

(52) U.S. Cl.
CPC ........ *B60K 35/00* (2013.01); *B60K 2370/115* (2019.05); *B60K 2370/1523* (2019.05);
(Continued)

(58) Field of Classification Search
CPC .............. B60K 35/00; B60K 2370/115; B60K 2370/1529; B60K 2370/166; B60K 2370/52; B60K 2370/1523; B60K 2370/164; B60K 2370/176; B60K 2370/1868; B60K 2370/1876; B60K 2370/182; B60K 2370/177; B60K 2370/184; B60K 2370/186; B60K 2370/195; B60Y 2200/11;
(Continued)

(56) References Cited

U.S. PATENT DOCUMENTS 10,259,324 B2 * 4/2019 Takamatsu ............. B60K 35/00
2017/0177957 A1 * 6/2017 Yokochi .................. G09F 19/18
(Continued)

FOREIGN PATENT DOCUMENTS

JP 2004-251881 9/2004
JP 2016-103171 6/2016
(Continued)

OTHER PUBLICATIONS

Japanese Office Action for Japanese Patent Application No. 2021-050685 dated Jan. 10, 2023.

*Primary Examiner* — Douglas M Wilson
(74) *Attorney, Agent, or Firm* — AMIN, TUROCY & WATSON, LLP

(57) ABSTRACT

A vehicle display device includes a display control unit configured to display a first content image in a first display region on the basis of first information and display a second content image in a second display region on the basis of second information on a display unit on which an image is superimposed on an outside scenery so that the superimposed image is viewed. The display control unit changes a display aspect of the first content image on the basis of content of the second information when the first content image and the second content image are simultaneously displayed on the display unit.

12 Claims, 15 Drawing Sheets

(52) U.S. Cl.
CPC ........... *B60K 2370/1529* (2019.05); *B60K 2370/164* (2019.05); *B60K 2370/166* (2019.05); *B60K 2370/176* (2019.05); *B60K 2370/177* (2019.05); *B60K 2370/182* (2019.05); *B60K 2370/184* (2019.05); *B60K 2370/186* (2019.05); *B60K 2370/1868* (2019.05); *B60K 2370/1876* (2019.05); *B60K 2370/195* (2019.05); *B60K 2370/52* (2019.05); *B60Y 2200/11* (2013.01); *G06F 3/0481* (2013.01); *G06F 3/0482* (2013.01); *G06F 2203/04803* (2013.01); *G09G 2380/10* (2013.01)

(58) Field of Classification Search
CPC .......... G06F 2203/04803; G06F 3/048; G06F 3/0481; G06F 3/0482; G09G 2380/10
See application file for complete search history.

(56) References Cited

U.S. PATENT DOCUMENTS

| | | | |
|---|---|---|---|
| 2021/0173531 A1* | 6/2021 | Ogata | B60K 37/06 |
| 2021/0221396 A1* | 7/2021 | Awano | B60R 21/00 |
| 2022/0242236 A1* | 8/2022 | Eguchi | B60K 35/00 |

FOREIGN PATENT DOCUMENTS

| | | |
|---|---|---|
| JP | 2017-092678 | 5/2017 |
| JP | 2019-059248 | 4/2019 |
| JP | 2019-139518 | 8/2019 |

* cited by examiner

VEHICLE DISPLAY DEVICE, DISPLAY CONTROL METHOD, AND STORAGE MEDIUM

CROSS-REFERENCE TO RELATED APPLICATION

Priority is claimed on Japanese Patent Application No. 2021-050685, filed Mar. 24, 2021, the content of which is incorporated herein by reference.

BACKGROUND OF THE INVENTION

Field of the Invention

The present invention relates to a vehicle display device, a display control method, and a storage medium.

Description of Related Art

In recent years, vehicles in which head-up displays are mounted have become widespread. Head-up displays display content images related to driving, content images unrelated to driving, and the like. The displayed various content images are appropriately changed in accordance with situations. Therefore, content images which are being displayed may be interrupted by other content images in some cases.

As a relevant technology, a technology for awaiting a manipulation input on a first screen during manipulation of a user on the first screen when an interruption process happens on a second screen on which a manipulation related to the interruption process is performed, and awaiting a manipulation input on the second screen during non-manipulation has been disclosed (for example, see Japanese Unexamined Patent Application, First Publication No. 2016-103171).

SUMMARY OF THE INVENTION

In the technology of the related, however, when a plurality of content images are displayed, each content image may not be displayed efficiently in some cases.

Aspects of the present invention have been devised in view of such circumstances and an objective of the present invention is to provide a vehicle display device, a display control method, and a storage medium capable of efficiently displaying each content image.

To solve the foregoing problem and achieve the objective, the following aspects are adopted in the present invention.

(1) According to an aspect of the present invention, a vehicle display device includes a display control unit configured to display a first content image in a first display region on the basis of first information and display a second content image in a second display region on the basis of second information on a display unit on which an image is superimposed on an outside scenery so that the superimposed image is viewed. The display control unit changes a display aspect of the first content image on the basis of content of the second information when the first content image and the second content image are simultaneously displayed on the display unit.

(2) In the vehicle display device according to the aspect of (1), the second content image may include a prompting image for urging a user to input a result and a result display image indicating the result input by the user. The display control unit may not display the first content image when the prompting image is displayed on the display unit, and the display control unit may display the first content image on the display unit when the result display image is displayed on the display unit.

(3) The vehicle display device according to the aspect of (2) may further include an input control unit configured to accept an input from the user. The input control unit may not accept the input of the prompting image from the user for a predetermined time after the prompting image is started.

(4) The vehicle display device according to the aspect of (2) or (3) may further include an input control unit configured to accept an input from the user. The first content image may include a selection item image which is able to be selected by the user. The input control unit may continuously accept a manipulation on the selection item image irrespective of whether the result display image is displayed on the display unit.

(5) In the vehicle display device according to the aspect of (4), the display control unit may superimpose and display the result display image and the selection item image at least partially when the result display image and the selection item image are displayed on the display unit.

(6) In the vehicle display device according to the aspect of (5), the input control unit may accept a manipulation on the selection item image irrespective of whether a part of the result display image is superimposed and displayed on the display unit. The display control unit may display the selection item image and the result display image so that the selection item image and the result display image are not superimposed when the selection item image accepted by the input control unit is superimposed and displayed on the result display image.

(7) In the vehicle display device according to any one of the aspects of (4) to (6), the display control unit may end the display of the result display image earlier than at a normal time when the result display image is displayed on the display unit and a manipulation on the selection item image is accepted.

(8) In the vehicle display device according to the aspect of (5), the input control unit may not accept a manipulation on the selection item image of the superimposed part when the superimposed part is displayed on the display unit.

(9) In the vehicle display device according to any one of the aspects of (1) to (8), the display control unit may change a display aspect of the second content image when a detection image indicating that another vehicle approaching an own vehicle is detected is displayed on the display unit.

(10) In the vehicle display device according to the aspect of (9), the display control unit may contract the second content image to display the second content image.

(11) In the vehicle display device according to any one of the aspects of (1) to (10), the display control unit may not display the first content image when detection information indicating that another vehicle approaching an own vehicle is detected is displayed on the display unit.

(12) In the vehicle display device according to the aspect of (11), the display control unit may not display the second content image.

(13) According to another aspect of the present invention, a display control method is performed using a computer mounted in a vehicle. The method includes: displaying a first content image in a first display region on the basis of first information on a display unit on which an image is superimposed on an outside scenery so that the superimposed image is viewed; displaying a second content image in a second display region on the basis of second information on the display unit; and changing a display aspect of the first content image on the basis of content of the second information when the first content image and the second content image are simultaneously displayed on the display unit.

(14) According to still another aspect of the present invention, a computer-readable non-transitory storage medium stores a program causing a computer mounted in a vehicle to perform: displaying a first content image in a first display region on the basis of first information on a display unit on which an image is superimposed on an outside scenery so that the superimposed image is viewed; displaying a second content image in a second display region on the basis of second information on the display unit; and changing a display aspect of the first content image on the basis of content of the second information when the first content image and the second content image are simultaneously displayed on the display unit.

According to (1) to (14), it is possible to display each content image efficiently.

DETAILED DESCRIPTION OF THE INVENTION

Hereinafter, embodiments of a vehicle display device, a display control method, and a storage medium of the present invention will be described with reference to the drawings. The vehicle display device is, for example, a device that controls a display device that is mounted in a vehicle (hereinafter referred to as a vehicle M) and displays an image superimposed on a scenery so that the image is viewed (which is an example of a "display device"). The display device is also referred to as a head-up display (HUD) device. For example, the display device is a device that displays a virtual image so that an observer can view the virtual image by causing light with an image to transmit through a front windshield of the vehicle M. The observer is, for example, a driver, but may be an occupant other than the driver. The display device may be implemented by projecting a virtual image to a display device (for example, a liquid crystal display or an organic electroluminescence (EL)) that has optical transparency and is mounted on the front windshield of the vehicle M or a transparent member (a visor, lenses of glasses, or the like) of a device worn on the body of a person. The display device may be a device on which a display device having optical transparency is mounted. In the following description, the display device is assumed to be a device that is mounted on the vehicle M and projects light with an image to the front windshield.

Overall Configuration

Figure 1:
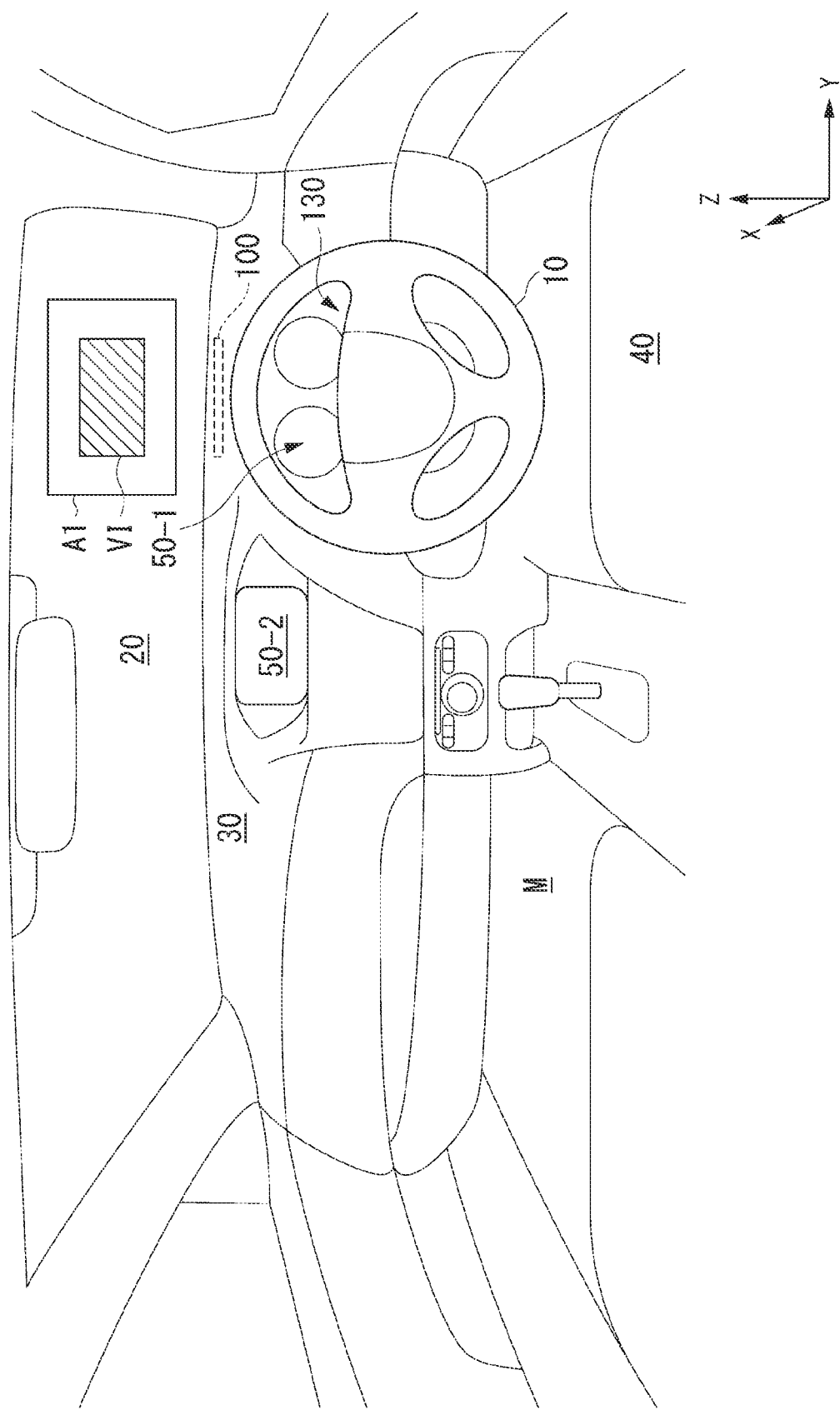
FIG. 1 is a diagram illustrating an exemplary configuration of an interior of a vehicle M in which a display device 100 is mounted according to an embodiment.

FIG. 1 is a diagram illustrating an exemplary configuration of an interior of the vehicle M in which a display device 100 is mounted according to an embodiment. The vehicle M includes, for example, a steering wheel 10 that controls steering of the vehicle M, a front windshield (which is an example of a reflector) 20 partitioning a vehicle exterior and a vehicle interior, and an instrument panel 30. The front windshield 20 is a member that has optical transparency. For example, the display device 100 causes a driver sitting on a driver seat 40 to view a virtual image VI by projecting light with an image to a displayable region A1 provided in a part of the front windshield 20 in front of the driver seat 40. In the following description, a virtual image is referred to as an "image" in some cases.

The display device 100 causes the driver to view, as the virtual image VI, for example, an image with information regarding support of driving of the driver or information regarding a predetermined event. The information regarding the support of the driving of the driver may include, for example, information such as a speed of the vehicle M, a driving force distribution ratio, an engine speed, an operation state shift position of a driving support function, a sign recognition result, and an intersection position. The driving support function is, for example, a direction indication function, adaptive cruise control (ACC), a lane keep assist system (LKAS), a collision mitigation brake system (CMBS), a traffic jam assist function, or the like.

The vehicle M may include not only the display device 100 but also a first display unit 50-1 or a second display unit 50-2. The first display unit 50-1 is, for example, a display device that is provided on the instrument panel 30 near the front of the driver seat 40 and can be viewed from a gap of the steering wheel 10 or over the steering wheel 10 by the driver. The second display unit 50-2 is mounted in, for example, a middle portion of the instrument panel 30. The second display unit 50-2 displays, for example, an image corresponding to a navigation process performed by a navigation device (not illustrated) mounted in the vehicle M or a video of a partner in a video telephone. The second display unit 50-2 may display a video program, reproduce a DVD, or display content such as a downloaded movie.

The vehicle M includes a manipulation switch 130 that accepts an instruction to switch ON and OFF of display on the display device 100 or an instruction to adjust a position of the virtual image VI. For example, the manipulation switch 130 is mounted at a position at which the driver sitting on the driver seat 40 can perform a manipulation without considerably changing her or his body position. For example, the manipulation switch 130 may be provided in front of the first display unit 50-1 or may be provided in a boss portion of the steering wheel 10. The manipulation switch 130 may be provided in a spoke connecting the steering wheel 10 with the instrument panel 30.

Configuration of Display Device 100

Figure 2:
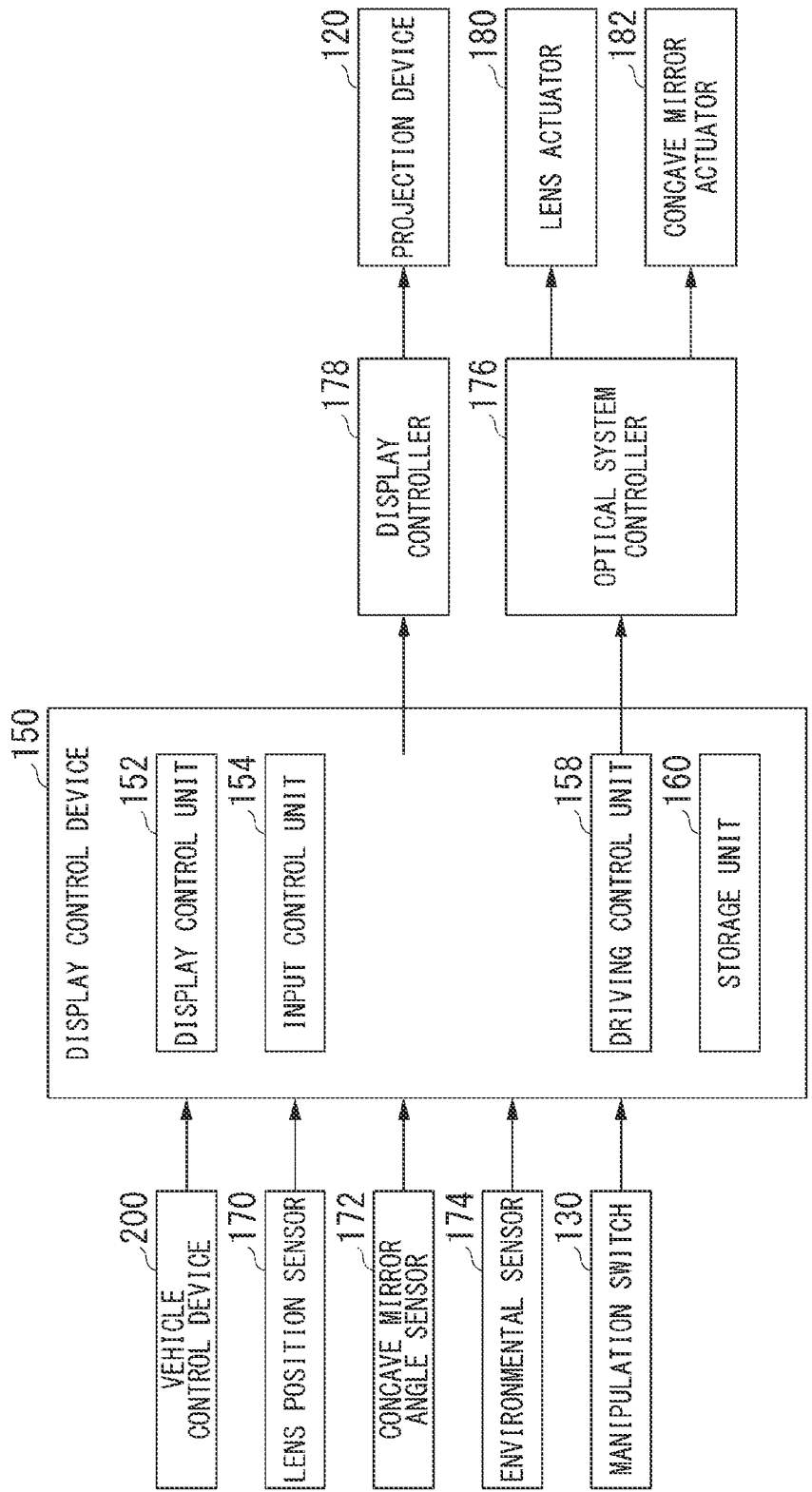
FIG. 2 is a diagram illustrating an exemplary configuration of the display device 100.

FIG. 2 is a diagram illustrating an exemplary configuration of the display device 100. As illustrated in FIG. 2, the display device 100 includes a lens position sensor 170, a concave mirror angle sensor 172, an environmental sensor 174, an optical system controller 176, a display controller 178, a lens actuator 180, a concave mirror actuator 182, and a projection device 120.

The lens position sensor 170 detects positions of one or more lenses included in an optical mechanism that adjusts a distance to a position at which light forms a virtual image at a predetermined position. The concave mirror angle sensor 172 detects a rotational angle of a concave mirror. The environmental sensor 174 detects, for example, a temperature of the projection device 120 or the optical mechanism. The environmental sensor 174 may detect illuminance around the vehicle M, detect a speed or a steering angle of the vehicle M, or detect objects (for example, obstacles such as other vehicles or pedestrians) around the vehicle.

The optical system controller 176 adjusts a virtual image viewing distance by driving the lens actuator 180 on the basis of a control signal output by the driving control unit 158. The optical system controller 176 adjusts a rotational angle of the concave mirror by driving the concave mirror actuator 182 on the basis of a control signal output by the driving control unit 158.

The display controller 178 controls a display aspect or content of an image output by the projection device 120. The display aspect of the image is, for example, luminance, a display position, a size, or the like.

The lens actuator 180 moves the positions of one or more lenses included in the optical mechanism by acquiring a driving signal from the optical system controller 176 and driving a motor or the like on the basis of the acquired driving signal. Thus, the virtual image viewing distance is adjusted.

The concave mirror actuator 182 adjusts a reflectional angle of the concave mirror by acquiring a driving signal from the optical system controller 176, driving a motor or the like on the basis of the acquired driving signal, and rotating the concave mirror actuator 182.

The vehicle control device 200 controls the vehicle M or acquires detection results of various sensors mounted in the vehicle M. For example, the vehicle control device 200 performs a driving support function of supporting driving of the driver of the vehicle M. When the driving support function is performed, for example, the vehicle M controls one or both of steering control and speed control regardless of a manipulation of a driving operator (for example, the steering wheel 10, an accelerating pedal, a braking pedal) by the driver. For example, when the ACC is performed as the driving support function, the vehicle control device 200 performs deceleration speed control (speed control) based on an inter-vehicle distance between the vehicle M and a front vehicle so that the vehicle M travels while maintaining a constant inter-vehicle distance between the vehicle M and the front vehicle, on the basis of information input via an object recognition device (not illustrated) mounted in the vehicle M. When the LKAS is performed as the driving support function, the vehicle control device 200 performs steering control such that the vehicle M travels while maintaining a traveling lane (keeping a lane) during present driving. When the CMBS is performed as the driving support function, the vehicle control device 200 performs deceleration control or stop control of the vehicle M in a case in which an inter-vehicle distance between the vehicle M and the front vehicle is less than a predetermined distance. The vehicle control device 200 outputs, for example, a driving supportable state to the display control device 150. The vehicle control device 200 outputs information (warning information) for giving a warning to the driver to the display control device 150 before the LKAS or the CMBS is performed. The warning information is, for example, a lane departure warning, a front vehicle approach warning, or the like.

The display control device 150 includes, for example, a display control unit 152, an input control unit 154, a driving control unit 158, and a storage unit 160. Such constituent elements are each implemented, for example, by causing a hardware processor such as a central processing unit (CPU) to execute a program (software). Some or all of the constituent elements may be implemented by hardware (including a circuit unit: circuitry) such as a large scale integration (LSI), an application specific integrated circuit (ASIC), a field-programmable gate array (FPGA), or a graphics processing unit (GPU) or may be implemented in combination of software and hardware. The program may be stored in advance in a storage device (not illustrated) such as an HDD or a flash memory of the display control device 150 or may be stored in a storage medium such as a DVD or CD-ROM which can be detachably mounted, and thus the storage medium may be mounted on a drive device to be installed in the HDD or the flash memory of the display control device 150.

The storage unit 160 is implemented by, for example, a storage device such as a random access memory (RAM), a read-only memory (ROM), a hard disk drive (HDD), or a flash memory.

Display Control on HUD Device

Figure 3:
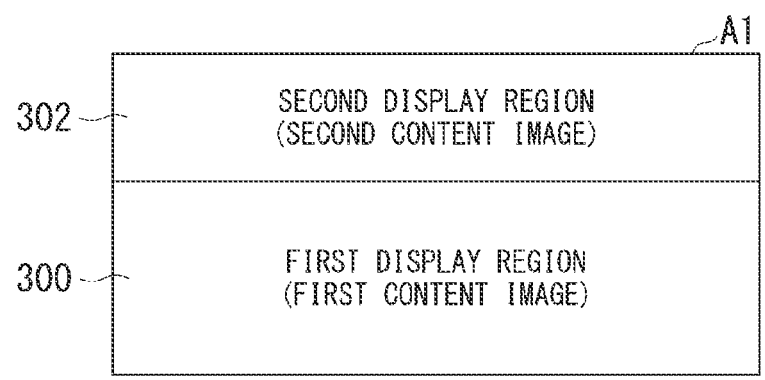
FIG. 3 is a diagram illustrating examples of a content image and a display region displayed in a displayable region A1.

Next, display control on an HUD device (the display device 100) will be described. First, the display control unit 152 and an input control unit 154 will be described with reference to FIGS. 3 to 6. FIG. 3 is a diagram illustrating examples of a content image and a display region displayed in a displayable region A1. The display control unit 152 displays a first content image in a first display region 300 of a displayable region A1 of a head-up display (HUD) device on the basis of first information. The first information is for example, information regarding driving or information regarding selection of a telephoning destination, a radio channel, or the like. The first content image is an image related to driving and displayed on the basis of the information regarding driving or an image related to selection and displayed on the basis of the information regarding the selection.

The display control unit 152 displays a second content image in a second display region 302 of the displayable region A1 of the HUD device on the basis of second information. The second information includes information for requesting a user to input a result and information indicating the result input by the user. The second content image is, for example, an image for requesting the user to input whether to respond to call reception or an image indicating a result input by the user, such as a radio channel selected by the user. In the embodiment, the "user" is a driver. Here, the "user" may include an occupant excluding the driver.

The display control unit 152 can display the first content image in a second display region 302. On the other hand, the display control unit 152 does not display the second content image in the first display region 300. The second content image is interrupted into the first content image and is displayed. The display control device 150 is connected for communication with a mobile phone or a smartphone through short-range wireless communication, and thus can obtain information indicating call reception at the time of call reception or obtain information of a telephone number at the time of telephoning.

In the displayable region A1 illustrated in FIG. 3, the first display region 300 is a downward region of the second display region 302 in the drawing, but the present invention is not limited thereto. The first display region 300 may be an upward region of the second display region 302 in the drawing. The first display region 300 and the second display region 302 are partitioned as the upward and downward regions in the drawing, but the present invention is not limited thereto. The first display region 300 and the second display region 302 may be partitioned to the right and left in the drawing. In FIG. 3, the first display region 300 can be a display region larger than the second display region 302 so that the plurality of first content images can be simultaneously displayed. Although the plurality of first content images are simultaneously displayed, good visibility can be guaranteed. The first display region 300 may be smaller than the second display region 302 or may have the same size as the second display region 302.

Display Example of Content Image

Figure 4:
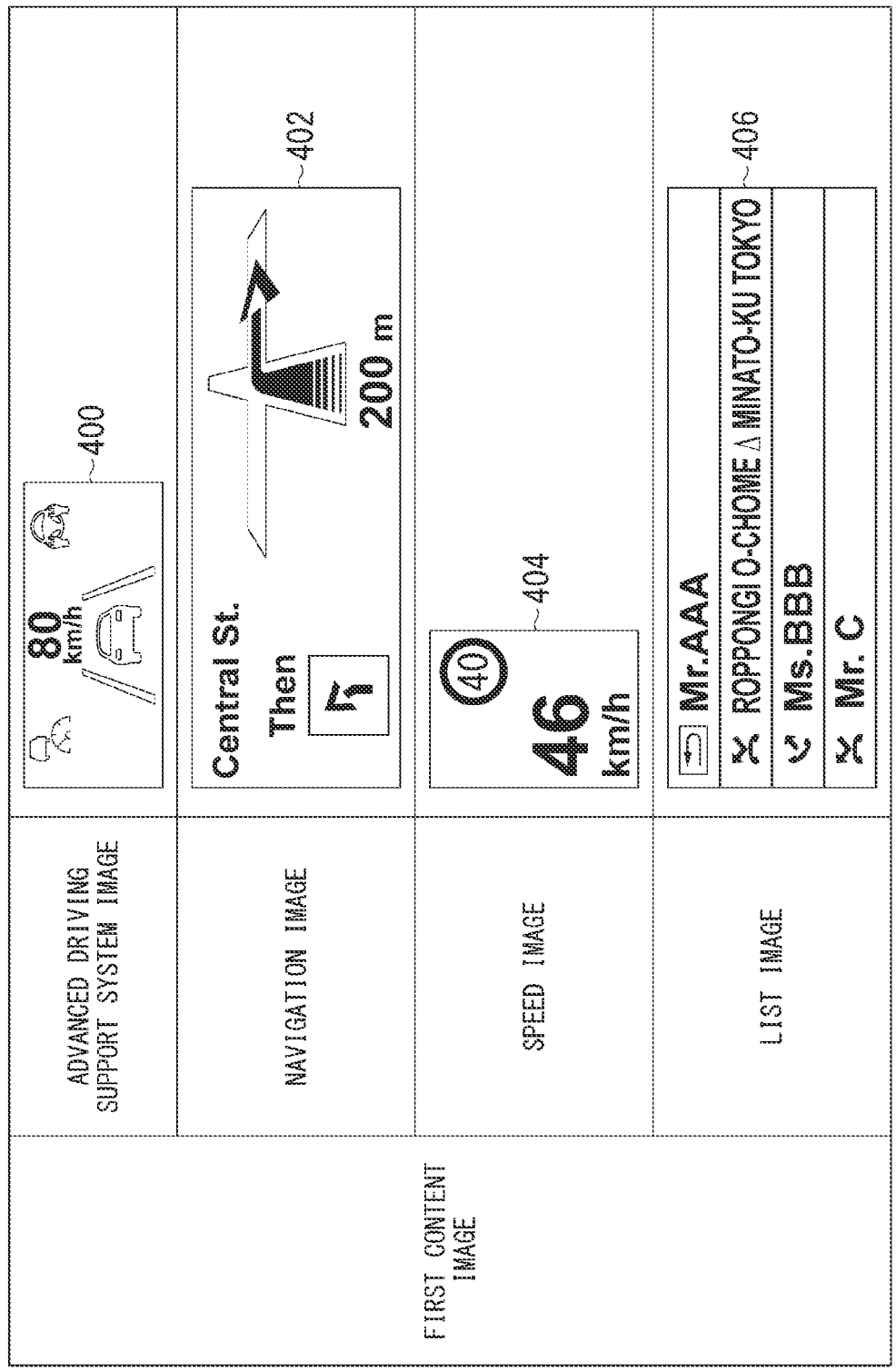
FIG. 4 is a diagram illustrating a display example of a first content image.

Hereinafter, a display example of the first and second content images will be described with reference to FIGS. 4 to 6. FIG. 4 is a diagram illustrating a display example of the first content image. As illustrated in FIG. 4, the first content image includes an advanced driving support system image 400, a navigation image 402, a speed image 404, and a list image 406.

The advanced driving support system image 400 is an image for providing display or a warning performed in accordance with a surrounding situation or supporting driving. The navigation image 402 is an image for indicating route guidance from a present position to a destination. The speed image 404 is an image indicating a speed limit of a road on which a vehicle is traveling. The list image 406 is an example of a selection item image and an image indicating selection items which a user can select. Specifically, the list image 406 is an image for accepting one selection item among a plurality of selection items from the user. The respective images which are the first content image displayed in the first display region 300 can be switched between through a user manipulation.

Figure 5:
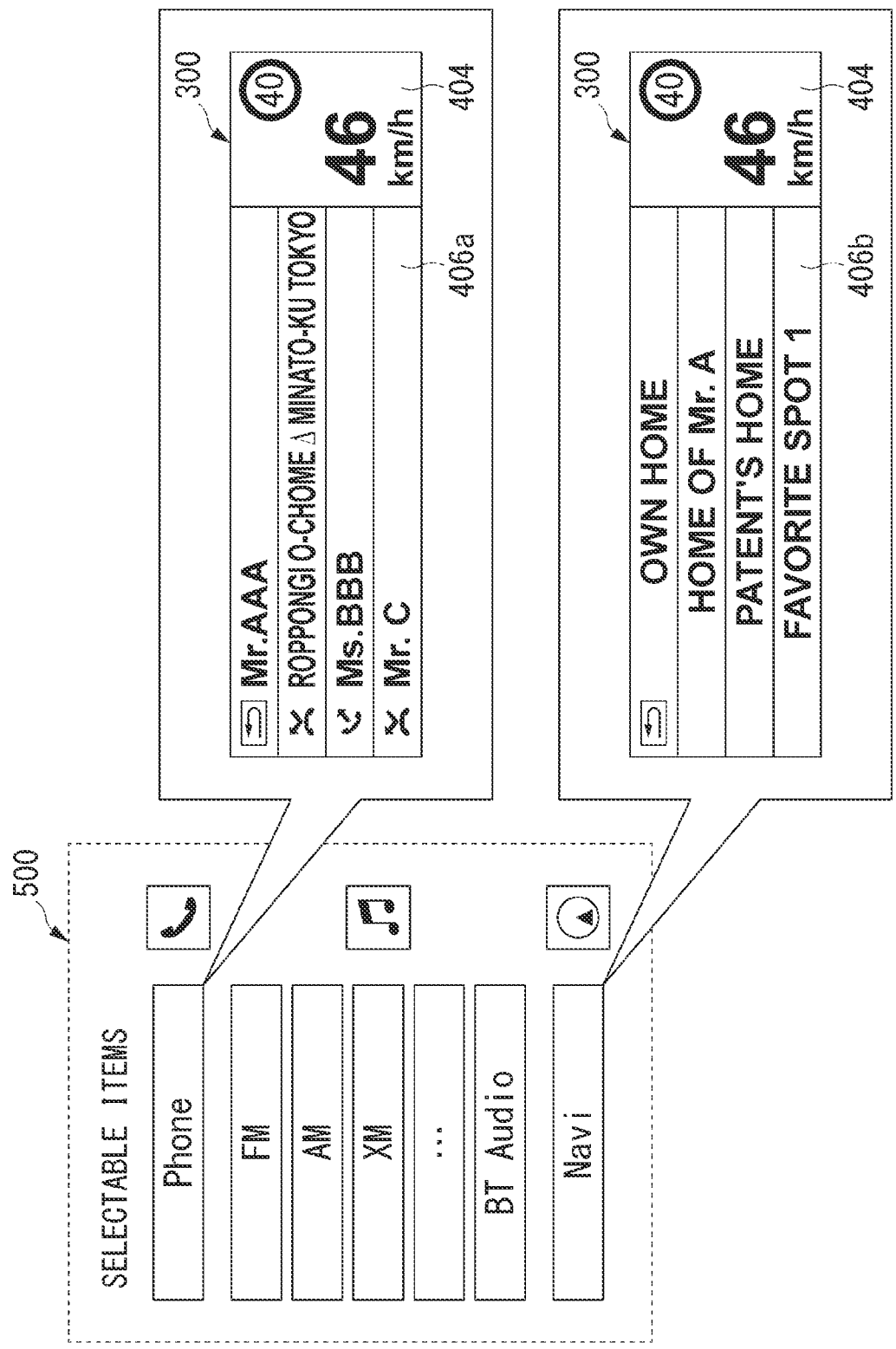
FIG. 5 is a diagram illustrating a specific example of a list image 406.

FIG. 5 is a diagram illustrating a specific example of the list image 406. In FIG. 5, kinds 500 of selection items include a telephone directory, radio channels, music pieces, and a destination. When the telephone directory is selected in the kinds 500, a list image 406a of the telephone directory is displayed in the first display region 300. For example, when the destination is selected in the kinds 500, a list image 406b of the destination is displayed in the first display region 300.

In both the list image 406a of the telephone directory and the list image 406b of the destination, four lines are displayed. When a scroll manipulation of displaying lines after the fifth line (not illustrated) is accepted, the lines after the fifth line can be displayed. For example, when "FM" is selected in the kinds 500, four lines of channel lists of FM radio are displayed in the first display region 300, although not illustrated.

In FIG. 5, in the first display region 300, speed images 404 are displayed to the right of the list image 406a of the telephone directory and the list image 406b of the destination. In this way, the plurality of first content images can be displayed in the first display region 300.

Figure 6:
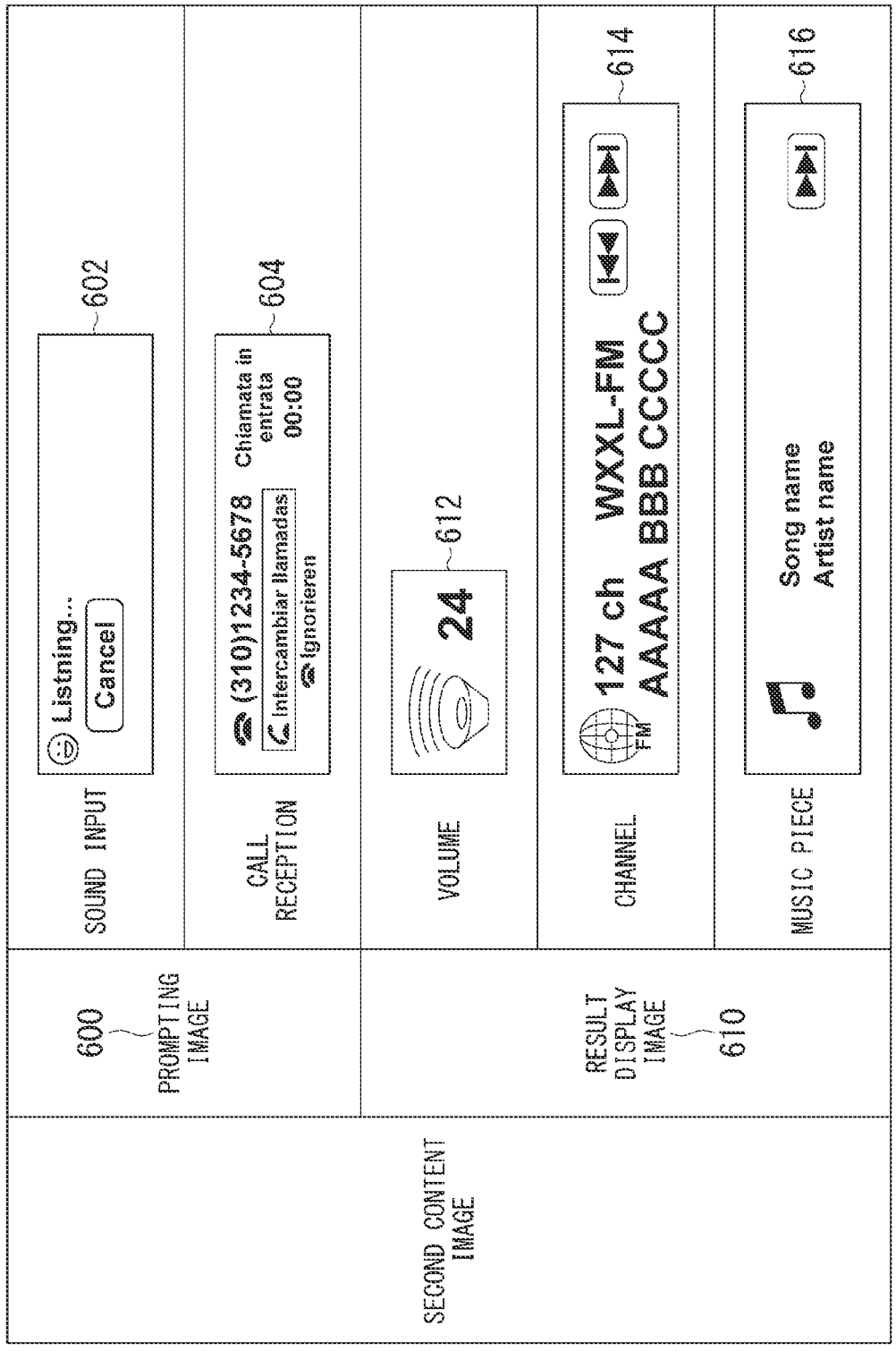
FIG. 6 is a diagram illustrating a display example of a second content image.
Figure 7:
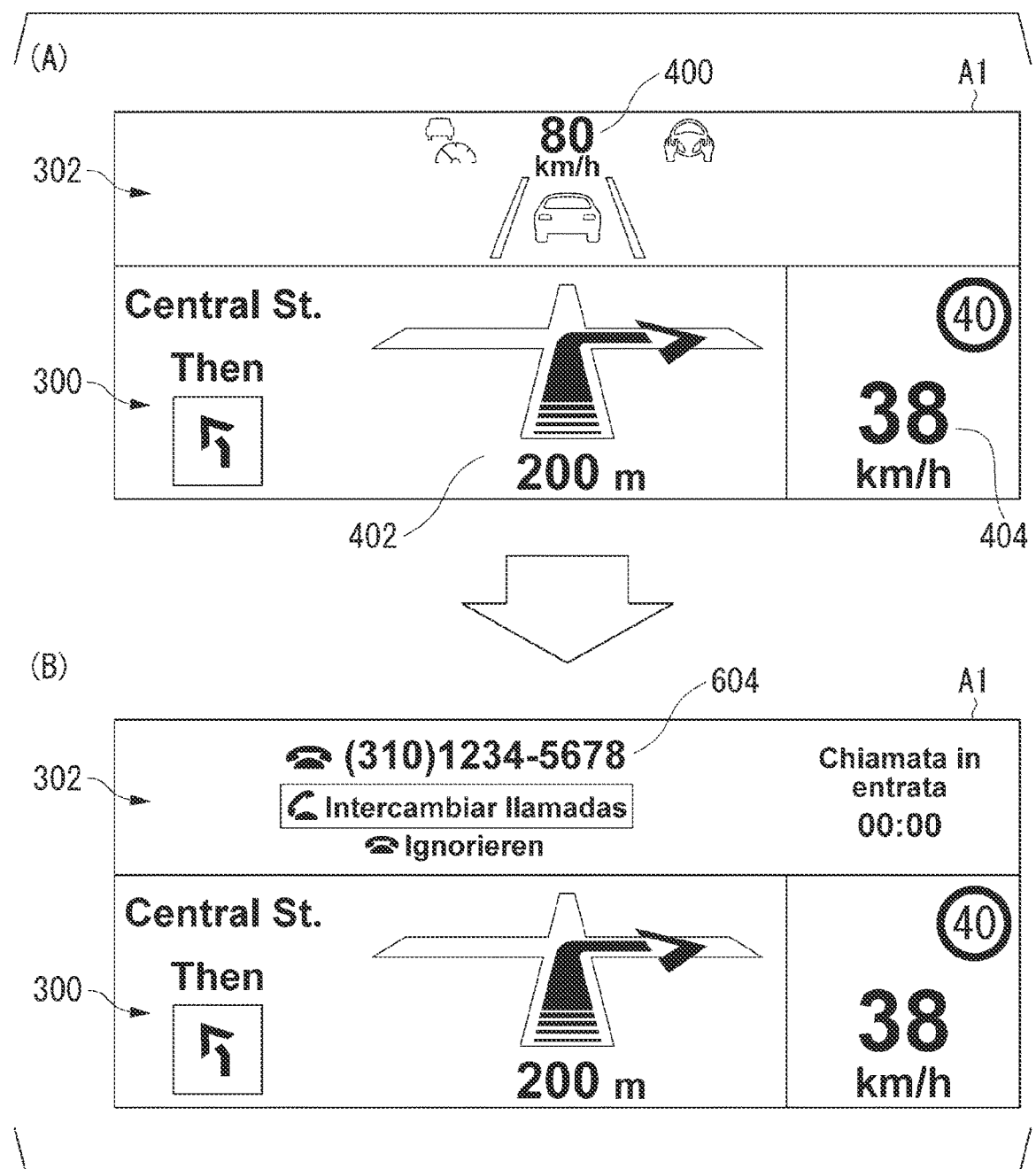
FIG. 7 is a diagram illustrating a display example of a content image displayed in the displayable region A1.

FIG. 6 is a diagram illustrating a display example of the second content image. As illustrated in FIG. 6, the second content image is classified into a prompting image 600 and a result display image 610. The prompting image 600 is an image for requesting a user to perform an input. As a specific example, the prompting image 600 includes a sound input image 602 and a call reception image 604.

The sound input image 602 is an image indicating that a sound input is accepted. While the sound input image 602 is displayed, a vocal sound made by the user can be recognized and various setting changes, various registrations, or the like can be performed. The sound input image 602 is not displayed when the various setting changes or the various registrations are completed. That is, an ending condition of the sound input image 602 is completion of the various setting changes or the various registrations.

The call reception image 604 is an image indicating that a call is received with a mobile phone or a smartphone. When the call reception image 604 is displayed, a call can be received or rejected in response to acceptance of a predetermined manipulation on the manipulation switch 130. The call reception image 604 is not displayed when call starting or call rejection is accepted. That is, the ending condition of the call reception image 604 is acceptance of the call starting or the call rejection. Here, the call reception image 604 may be displayed until completion of the call when the call is started. In the call reception image 604, only specific information such as a call time may be displayed when the call is started. When the call is started, a display aspect of the call reception image 604 may be changed and displayed, that is, for example, an icon image may be displayed.

The result display image 610 is an image indicating a result input by the user. As a specific example, the result display image 610 includes a volume image 612, a channel image 614, and a music piece image 616. The volume image 612 is an image indicating a changed volume when the volume is changed by the user. The channel image 614 is an image indicating a changed channel when the channel of radio is changed by the user. The music piece image 616 is an image indicating a changed music piece when the music piece is changed by the user. The input of the user includes a sound input and a manipulation input. The result display image 610 is not displayed when a predetermined notification time (for example, 5 seconds) has passed.

When the first content image and the second content image are simultaneously displayed on the HUD device, the display control unit 152 changes a display aspect of the first content image on the basis of content of the second information. Specifically, the display control unit 152 contracts or does not display a display region of the first content image on the basis of the content of the second information.

The non-display of the first content image may be display in which the first content image cannot be viewed by the user. Specifically, the non-display of the first content image means that the first content image is not viewed by superimposing and displaying the second content image on the first content image or means that the first content image is inherently not displayed.

Display Examples of Content Images Displayed in Displayable Region A1

Here, display examples of content images displayed in the displayable region A1 will be described with reference to FIGS. 7 to 11. FIGS. 7 to 11 are diagrams illustrating display examples of content images displayed in the displayable region A1.

As illustrated in FIG. 7(A), the navigation image 402 and the speed image 404 are displayed in the first display region 300 of the displayable region A1. The advanced driving support system image 400 is displayed in the second display region 302. It is assumed that a call is received on a screen illustrated in FIG. 7(A). In this case, the screen transitions to a screen illustrated in FIG. 7(B).

As illustrated in FIG. 7(B), the call reception image 604 is superimposed and displayed on the advanced driving support system image 400 in the second display region 302 of the displayable region A1. The call reception image 604 is not displayed when the call starting or the call rejection is accepted. Thus, the user can ascertain the call reception while viewing the front side.

Display or Non-Display of First Content Image

Here, the display control unit 152 displays or does not display the first content image in accordance with the content of the second information. Specifically, the display control unit 152 displays or does not display the first content image in accordance with whether the second content image is the prompting image 600 or the result display image 610.

Figure 8:
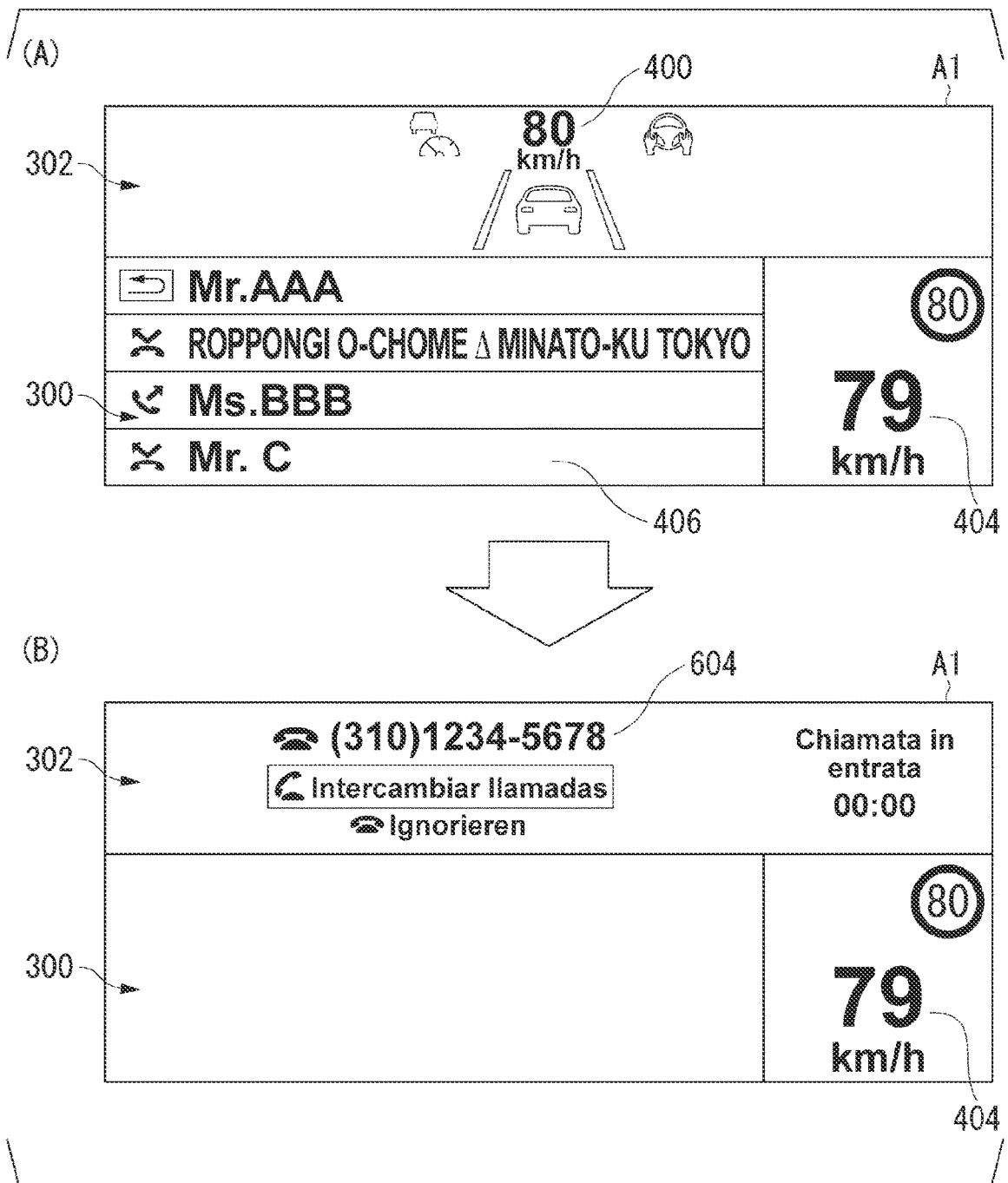
FIG. 8 is a diagram illustrating a display example of a content image displayed in the displayable region A1.

First, non-display of the first content image will be described. The display control unit 152 does not display the first content image when the prompting image 600 is displayed. This will be described specifically with reference to FIG. 8. As illustrated in FIG. 8(A), for example, the list image 406 and the speed image 404 are displayed in the first display region 300 of the displayable region A1. The advanced driving support system image 400 is displayed in the second display region 302. It is assumed that a call is received on a screen illustrated in FIG. 8(A). In this case, the screen transitions to a screen illustrated in FIG. 8(B).

As illustrated in FIG. 8(B), the call reception image 604 is superimposed and displayed on the image of the advanced driving support system image 400 in the second display region 302 of the displayable region A1. The list image 406 of the first display region 300 is erased. In this way, when a call is received, the display control unit 152 erases the list image 406 which is unlikely to be selected by the user. Therefore, content of which the user is notified can be clarified.

As illustrated in FIG. 8(B), the display control unit 152 continuously displays the speed image 404 in the first display region 300. That is, when the first content image is displayed in the first display region 300 other than the list image 406 and the prompting image 600 (the call reception image 604) is displayed in the second display region 302, the display control unit 152 does not erase the first content image. Thus, when the prompting image 600 (the call reception image 604) is displayed, the user can also check a speed. Here, when the prompting image 600 is displayed in the second display region 302, the first content image may be erased other than the list image 406.

The input control unit 154 accepts an input from the user for the prompting image 600 (the call reception image 604 in the drawing). The input control unit 154 accepts an input using, for example, the manipulation switch 130. The input control unit 154 may accept an input from the user in accordance with a sound input.

Start of Call Unintended by User

Here, it is assumed that a call is received when the user selects a selection item in the list image 406 of FIG. 8(A). More specifically, when the user attempts to perform a manipulation of selecting one selection item in the list image 406 illustrated in FIG. 8(A), it is assumed that the call reception image 604 of FIG. 8(B) is displayed and a predetermined manipulation is accepted by the manipulation switch 130. In this case, there is concern of a call being started unintentionally.

Accordingly, until the prompting image 600 is started and a predetermined time has passed, the input control unit 154 does not accept an input from the user in the prompting image 600. The waiting time is, for example, 0.1 to 0.5 seconds and can be set to any time. Thus, when the user selects a selection item in the list image 406, it is possible to inhibit a call from being started unintentionally although a call is received.

In a case in which a call is received when the user does not select a selection item in the list image 406, there is small concern of a call unintended by the user being started. Therefore, in this case, the input control unit 154 may receive an input from the user in the prompting image 600 without waiting for a predetermined waiting time that has passed.

Case in which First Content Image is Displayed

Figure 9:
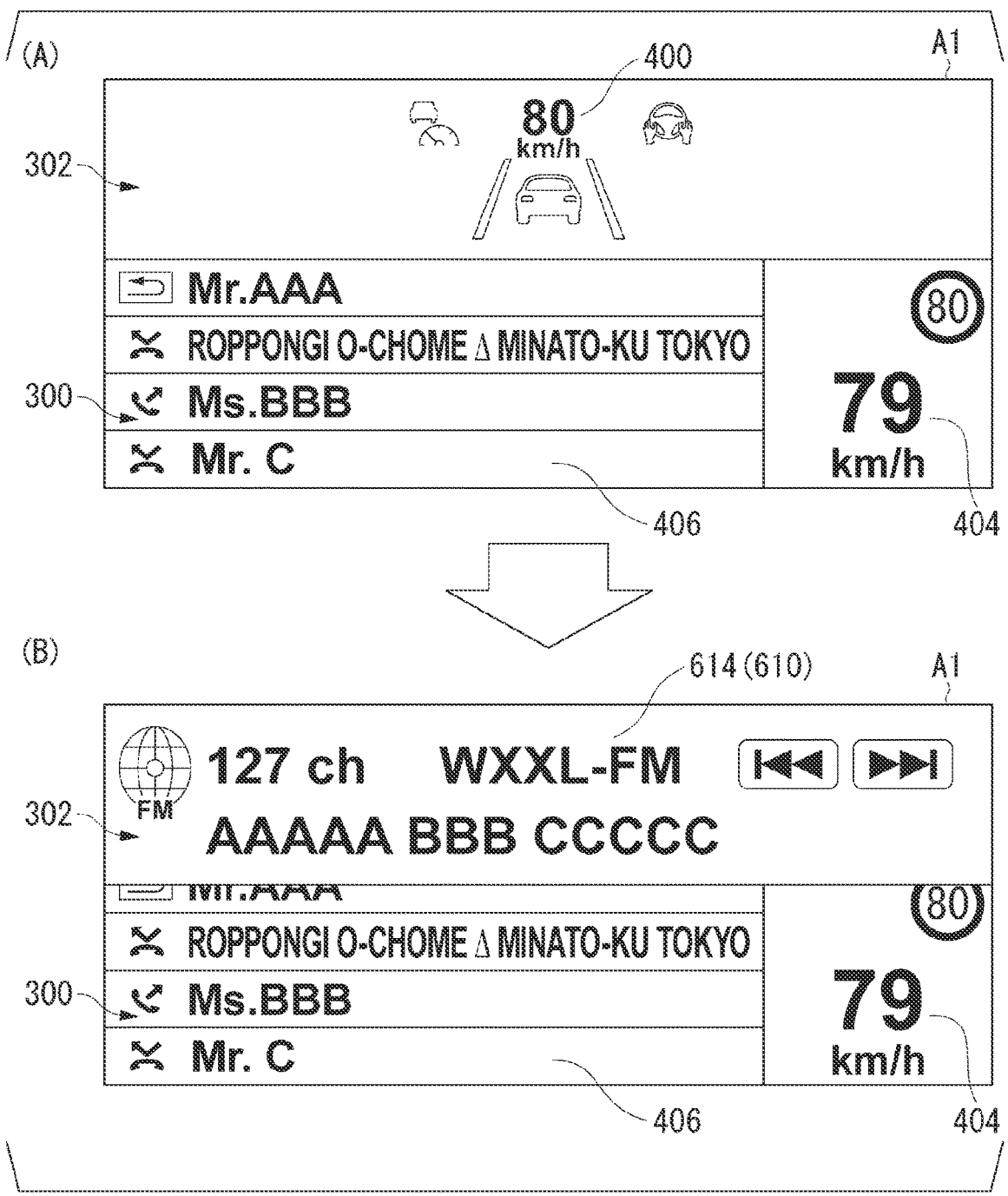
FIG. 9 is a diagram illustrating a display example of a content image displayed in the displayable region A1.
Figure 10:
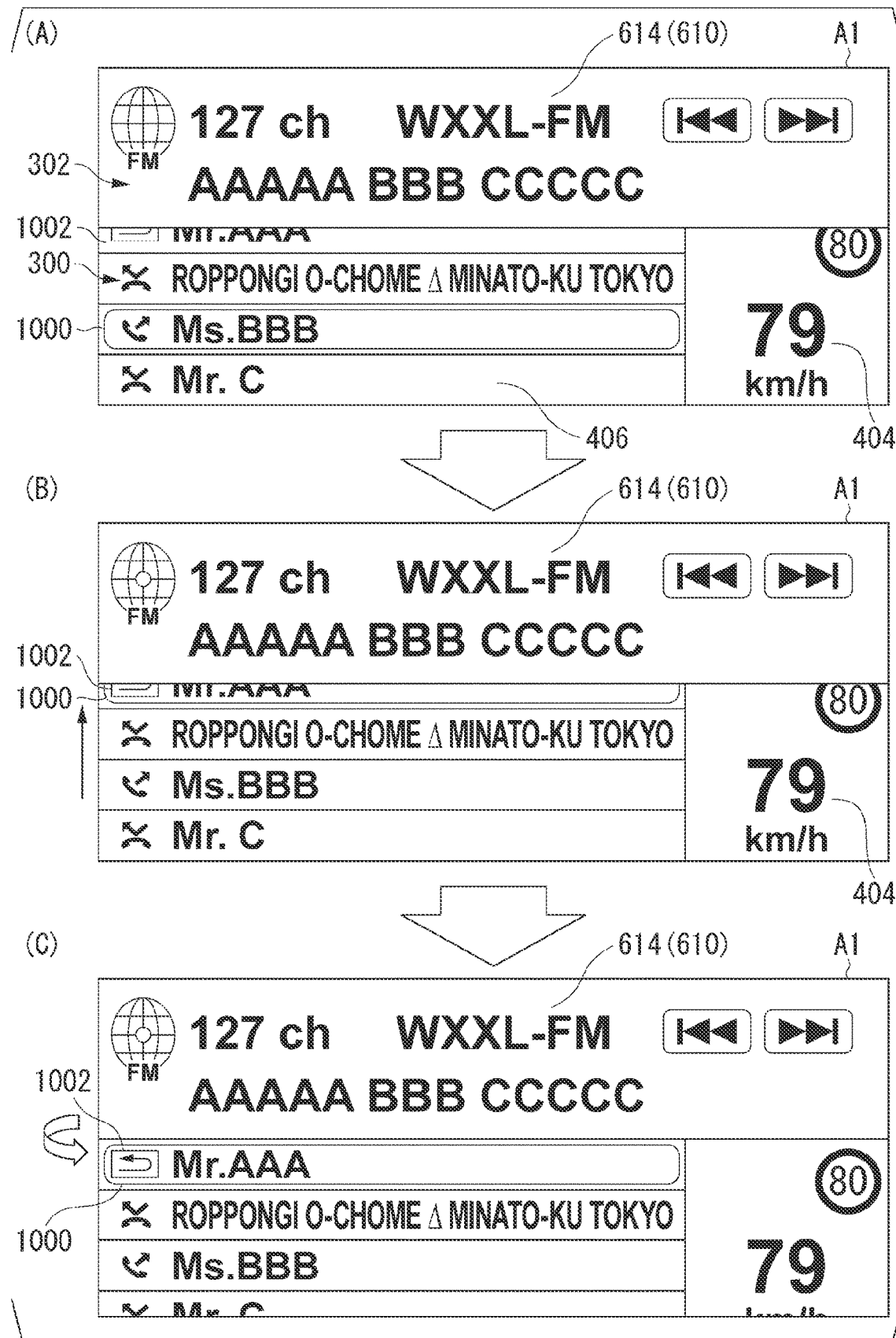
FIG. 10 is a diagram illustrating a display example of a content image displayed in the displayable region A1.

Next, display of the first content image will be described. The display control unit 152 displays the first content image when the result display image 610 is displayed. This will be described specifically with reference to FIG. 9. FIG. 9(A) is a screen similar to that of FIG. 8(A). It is assumed that a channel of radio is changed while the screen illustrated in FIG. 9(A) is being displayed. In this case, the screen transitions to the screen illustrated in FIG. 9(B).

As illustrated in FIG. 9(B), a channel image 614 is superimposed and displayed on the advanced driving support system image 400 in the second display region 302 of the displayable region A1. The list image 406 of the first display region 300 remains as it is. Thus, when the channel of radio is changed, the user can also check the list image 406 (406b) of the telephone directory.

As illustrated in FIG. 9(B), the display control unit 152 continuously displays the speed image 404 in the first display region 300. That is, when the first content image other than the list image 406 is displayed in the first display region 300 and the result display image 610 (the channel image 614) is displayed in the second display region 302, the display control unit 152 does not erase the first content image. Thus, when the result display image 610 (the channel image 614) is displayed, the user can also check a speed.

Selection Manipulation on List Image 406

Here, the input control unit 154 accepts a manipulation (a selection manipulation) on the list image 406 from the user in the list image 406. The input control unit 154 continuously accepts the selection manipulation on the list image 406 irrespective of whether the result display image 610 is displayed. This will be described specifically with reference to FIG. 10.

As illustrated in FIG. 10(A), the channel image 614 is displayed in the second display region 302 of the displayable region A1. A cursor 1000 indicating the selection manipulation of the user is displayed in the list image 406. The cursor 1000 is an image in which a selection item image of a selection target is surrounded by a thick-bordered box and movement of the cursor 1000 can be displayed vertically in response to a manipulation of the user. The input control unit 154 also displays the cursor 1000 and accepts a selection manipulation when the channel image 614 is displayed. Thus, when the channel image 614 is displayed, a manipulation of selecting a selection item by the user is not inhibited. To confirm the selection item instructed by the cursor 1000, it is necessary to perform a confirming manipulation different from a selection manipulation from the manipulation switch 130.

Display of Superimposition of Result Display Image 610 on List Image 406

Here, when the result display image 610 and the list image 406 are displayed on the HUD device, the display control unit 152 superimposes and displays the list image 406 and the result display image 610 at least partially. This will be described specifically. As illustrated in FIG. 10(A), the channel image 614 is superimposed and displayed on an image indicating the uppermost selection item (hereinafter referred to as a "specific selection item 1002") among the plurality of selection items indicated by the list image 406, and thus visibility deteriorates partially in the display. On the other hand, the user can be clearly notified of the result display image 610.

The input control unit 154 accepts a manipulation of selecting the list image 406 irrespective of whether the list image 406 and the result display image 610 are partially superimposed and displayed. Therefore, as illustrated in FIG. 10(B), the user selects the specific selection item 1002 in some cases. That is, the specific selection item 1002 is instructed by the cursor 1000 in accordance with a manipulation of the user. In this case, the user does not view the part of the specific selection item 1002 and it is difficult to ascertain the specific selection item 1002.

Accordingly, as illustrated in FIG. 10(C), when the manipulation of selecting the specific selection item 1002 is accepted, the display control unit 152 displays the specific selection item 1002 so that the specific selection item 1002 is not superimposed on the result display image 610. As illustrated, the selection item is lowered by one stage and is displayed. A manipulation of confirming the specific selection item 1002 can be accepted after movement to a position at which the specific selection item 1002 and the result display image 610 are not superimposed.

Control of Display Period of Result Display Image 610

When the result display image 610 is displayed and the input control unit 154 accepts a manipulation on the list image 406, the display control unit 152 ends the display of the result display image 610 quickly than at the normal time. For example, at the normal time, the display period of the result display image 610 is 5 seconds. On the other hand, when a manipulation of selecting the list image 406 is accepted, the display period of the result display image 610 is set to, for example, 3 seconds. Here, a period in which it is detected whether there is the manipulation of selecting the list image 406 is, for example, a period from a time several seconds before at which the display of the result display image 610 starts to the end of the display of the result display image 610. That is, even in a case in which a timing at which the selection manipulation is accepted is earlier than the display of the result display image 610, the display control unit 152 ends the display of the result display image 610 earlier than at the normal time in some cases.

Display Control when Another Vehicle Approaches

The display control unit 152 can display a vehicle detection image indicating that another vehicle approaching the vehicle M is detected. The other vehicle is the vehicle M with which a collision can occur as soon as they meet at an intersection with low visibility. A camera is provided at a corner of a front portion of the vehicle M, and thus another vehicle can be detected using a detection result of the camera. The display control unit 152 displays a vehicle detection image using the detection result of the other vehicle acquired from the vehicle control device 200. A display example of the vehicle detection image will be described with reference to FIG. 11(A).

As illustrated in FIG. 11(A), a vehicle detection image 1100 is displayed in the displayable region A1. The vehicle detection image 1100 includes a vehicle detection image 1100a indicating that a vehicle becomes close from the right and a vehicle detection image 1100b indicating that a vehicle becomes close from the left. It is assumed that a call is received on the screen illustrated in FIG. 11(A). In this case, the display control unit 152 changes a display aspect of the second content image. That is, when the vehicle detection image 1100 and the second content image are simultaneously displayed on the HUD device, the display control unit 152 changes the display aspect of the second content image.

For example, the display control unit 152 contracts and displays the second content image. Specifically, for example, as illustrated in FIG. 11(B), the display control unit 152 displays a call reception icon image 1110 indicating call reception in the second display region 302 of the displayable region A1. In this way, when the vehicle detection image 1100 is displayed and another vehicle approaches, driving can be concentrated on by changing the display aspect of the second content image. In FIG. 11(B), the example in which the second content image is the call reception image 604 of the prompting image 600 has been described. The same applies to a case in which the second content image is the result display image 610. That is, the result display image 610 is also displayed as an icon image when the result display image 610 is displayed simultaneously with the vehicle detection image 1100.

Figure 11:
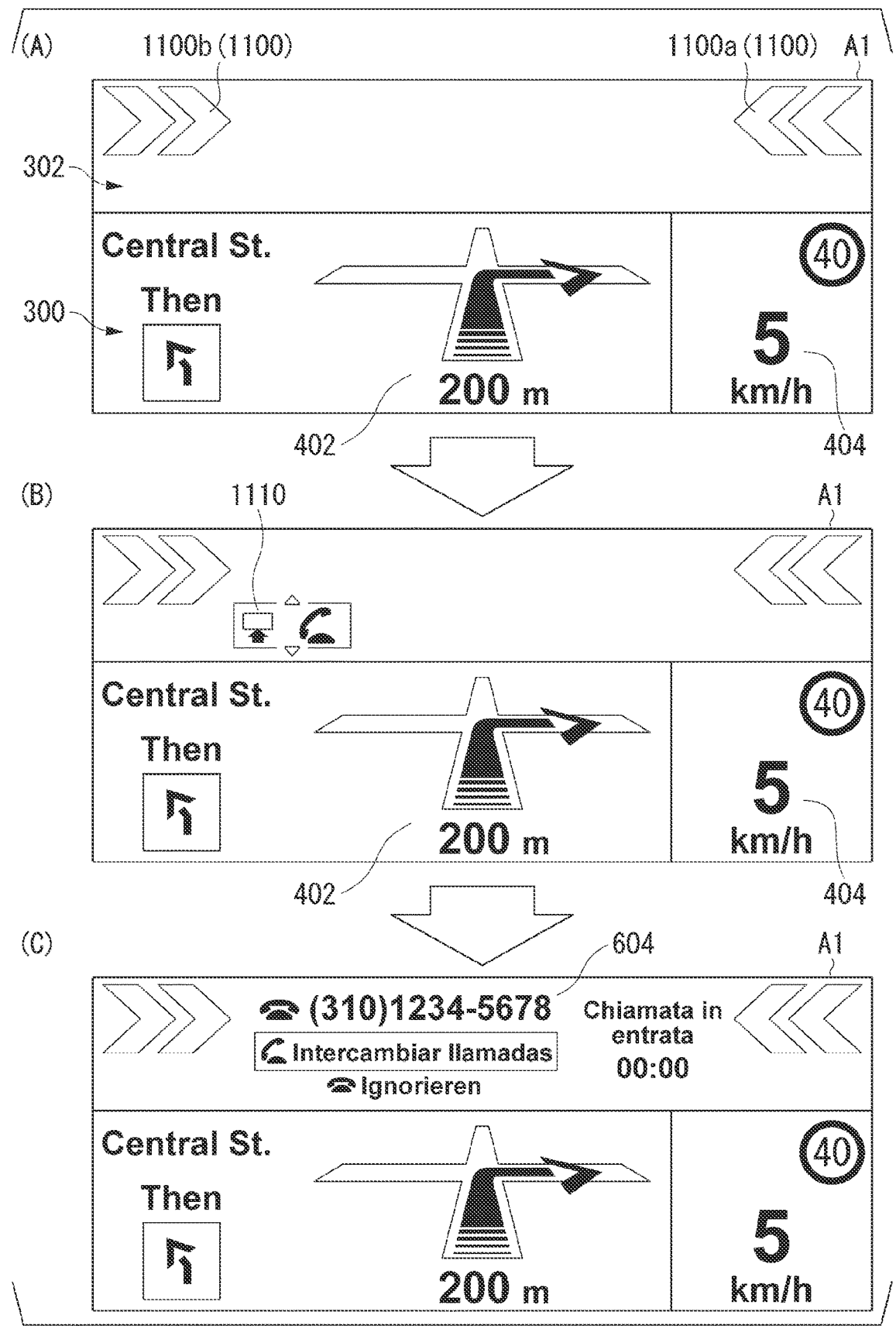
FIG. 11 is a diagram illustrating a display example of a content image displayed in the displayable region A1.

When the manipulation switch 130 accepts a predetermined manipulation as a manipulation of contracting or cancelling the call reception icon image 1110 on the screen illustrated in FIG. 11(B), the call reception image 604 in a normal display aspect is displayed, as illustrated in FIG. 11(C). Call starting or call rejection can also be selected in a state in which the call reception icon image 1110 of FIG. 11(B) is displayed. After the call reception image 604 of FIG. 11 (C) is displayed, the call starting or the call rejection can also be selected.

Process During Display of List Image 406 by Display Control Device 150

Figure 12:
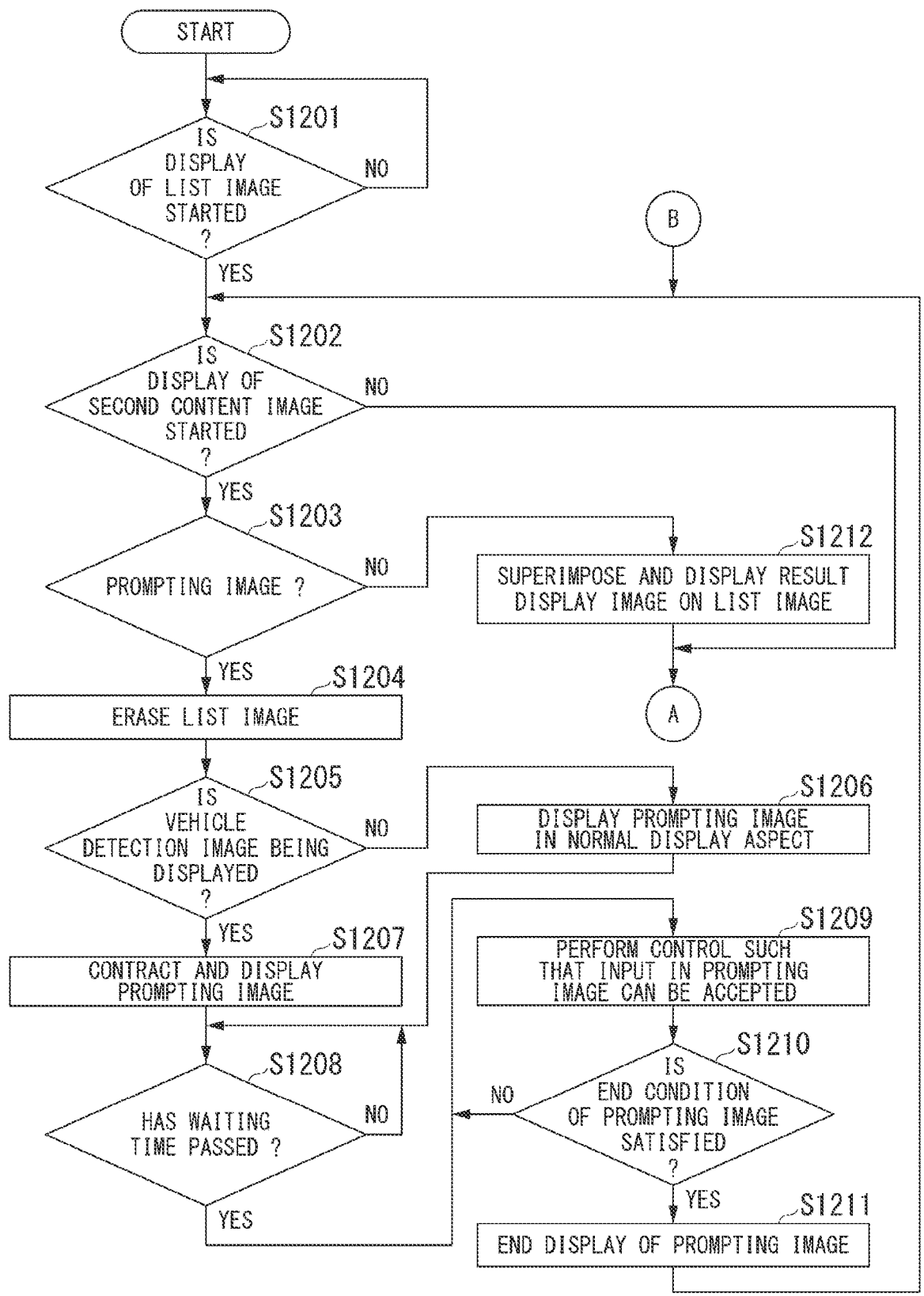
FIG. 12 is a flowchart illustrating an example of a process performed by a display control device 150 while a list image 406 is displayed.
Figure 13:
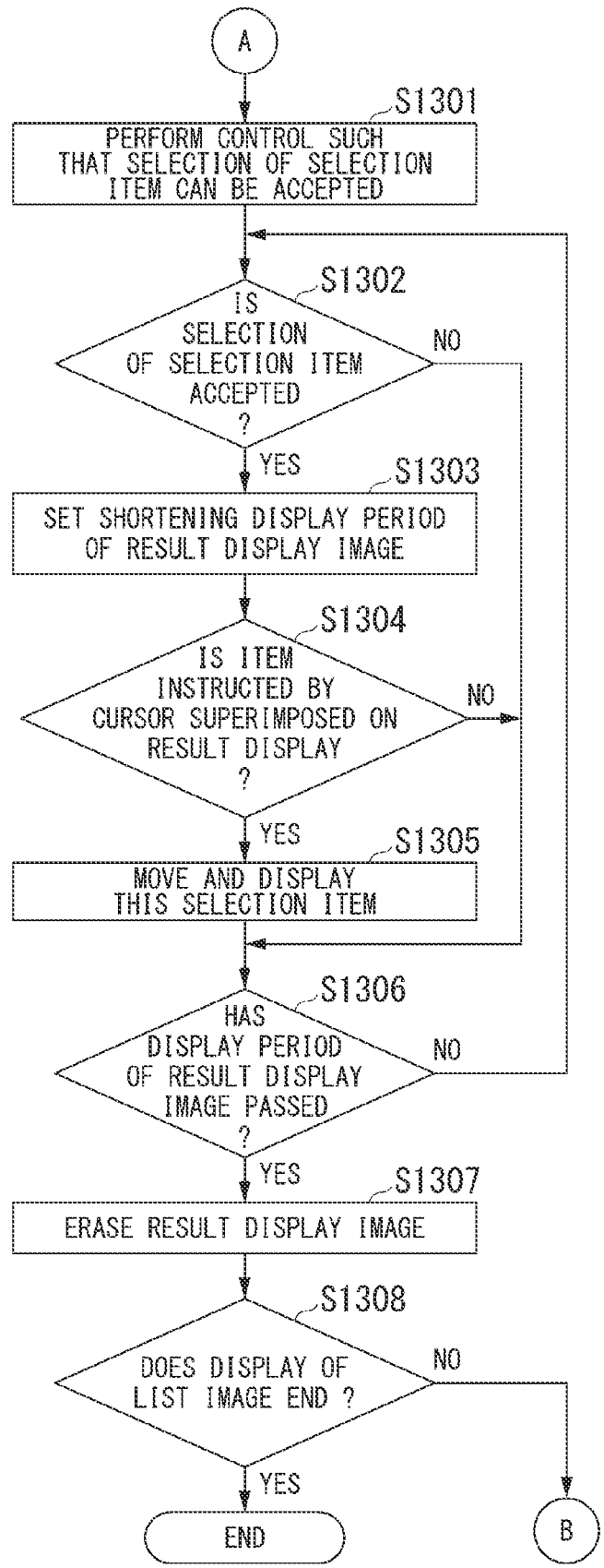
FIG. 13 is a flowchart illustrating an example of a process performed by the display control device 150 while the list image 406 is displayed.

FIGS. 12 and 13 are flowcharts illustrating an example of a process performed by a display control device 150 while the list image 406 is displayed. In FIG. 12, the display control unit 152 determines whether display of the list image 406 is started on the HUD device (step S1201). The display control unit 152 waits until the display of the list image 406 is started. When the display of the list image 406 is started, the display control unit 152 determines whether the display of the second content image on the HUD device is started (step S1202).

When the display of the second content image is started, the display control unit 152 determines whether the second content image is the prompting image 600 (step S1203). When the second content image is the prompting image 600, the display control unit 152 erases the list image 406 (step S1204). Then, the display control unit 152 determines whether the vehicle detection image 1100 is being displayed (step S1205). When the vehicle detection image 1100 is not being displayed, the display control unit 152 displays the prompting image 600 in the normal display aspect (step S1206), and the process proceeds to step S1208.

Conversely, when the vehicle detection image 1100 is being displayed in step S1205, the prompting image 600 is contracted and displayed (step S1207). Then, the input control unit 154 determines whether a predetermined waiting time has passed (step S1208).

The input control unit 154 waits until the predetermined waiting time has passed. When the predetermined waiting time has passed, the input control unit 154 performs control such that an input on the prompting image 600 can be accepted (step S1209). When the prompting image 600 is contracted and displayed and a contracting or cancelling manipulation is accepted in step S1209, the prompting image 600 is displayed in the normal display aspect.

Subsequently, the input control unit 154 determines whether the end condition of the prompting image 600 is satisfied (step S1210). The end condition of the prompting image 600 is that various setting changes or various registrations in the sound input image 602 are completed, or the call starting or the call rejection in the call reception image 604 is accepted.

When the end condition of the prompting image 600 is not satisfied, the input control unit 154 returns the process to step S1209. Conversely, when the end condition of the prompting image 600 is satisfied, the display control unit 152 ends the prompting image 600 (step S1211) and returns the process to step S1202.

When the display of the second content image is not started in step S1202, the display control unit 152 causes the process to proceed to step S1301 of FIG. 13. When the second content image is not the prompting image 600 in step S1203, that is, the second content image is the result display image 610, the display control unit 152 superimposes and displays the result display image 610 on the list image 406 (step S1212).

Then, the input control unit 154 displays the cursor 1000 (see FIG. 10) and performs control such that selection of a selection item indicating the list image 406 can be accepted (step S1301). Subsequently, the input control unit 154 determines whether to accept the selection of the selection item is accepted (step S1302). When the selection of the selection item is not accepted, the input control unit 154 causes the process to proceed to step S1306. When the selection of the selection item is accepted, the display control unit 152 sets to shorten the display period of the result display image 610 (step S1303).

Then, the display control unit 152 determines whether the selection item instructed by the cursor 1000 is the selection item (the specific selection item 1002 in FIG. 10) superimposed on the result display image 610 (step S1304). When the selection item instructed by the cursor 1000 is not the specific selection item 1002, the display control unit 152 causes the process to proceed to step S1306. When the selection item instructed by the cursor 1000 is the specific selection item 1002, the display control unit 152 moves the display position of the specific selection item 1002 to a position at which the specific selection item 1002 is not superimposed on the result display image 610 (see FIG. 10(C)) and displays the selection item (step S1305).

Then, the display control unit 152 determines whether the display period of the result display image 610 has passed (step S1306). When the display period of the result display image 610 has not passed, the display control unit 152 returns the process to step S1302. When the shortening setting of the display period in step S1303 in the previous process is completed in the transition process in the case of return to step S1302, the display control unit 152 may skip the process of step S1303.

When the display period of the result display image 610 has passed in step S1306, the display control unit 152 erases the result display image 610 (step S1307). Then, the display control unit 152 determines whether the display of the list image 406 ends (step S1308). The end of the display of the list image 406 is, for example, acceptance of a manipulation of confirming the selection item instructed by the cursor 1000 or acceptance of the end of the screen of the list image 406.

When the display of the list image 406 does not end, the display control unit 152 returns the process to step S1202. When the display of the list image 406 ends, the input control unit 154 ends the series of processes.

The display control device 150 according to the above-described embodiment changes the display aspect of the first content image based on the content of the second information when the first content image and the second content image are simultaneously displayed on the HUD device. Therefore, the HUD device can also display the first content image while preferentially displaying the second content image. Accordingly, since the content images can be efficiently displayed, the display region of the HUD device can be efficiently utilized.

The display control device 150 according to the embodiment does not display the first content image when the prompting image 600 is displayed on the HUD device. Thus, it is possible to cause the user to focus on only the prompting image 600. The display control device 150 displays the first content image when the result display image 610 is displayed on the HUD device. Thus, since the result display image 610 and the first content image are simultaneously displayed, the user can be notified of the content indicated by this content image.

The display control device 150 according to the embodiment does not accept an input in the prompting image 600 from the user during the predetermined time after the prompting image 600 is started. Thus, although the user performs a predetermined operation with the manipulation switch 130 and the prompting image 600 is displayed, an input unintended by the user can be caused not to be performed.

The display control device 150 according to the embodiment continuously accepts a manipulation on the selection item of the list image 406 irrespective of whether the result display image 610 is displayed on the HUD device. Thus, when the result display image 610 is displayed, a selection item can also be selected. Therefore, it is possible to improve convenience.

The display control device 150 according to the embodiment superimposes and displays the list image 406 and the result display image 610 at least partially when the list image 406 and the result display image 610 are displayed on the HUD device. Thus, when the result display image 610 is displayed, the user can also check the selection items of the list image 406. Accordingly, it is possible to efficiently utilize the display region of the HUD device.

The display control device 150 according to the embodiment accepts a manipulation on the list image 406 irrespective of whether the part of the list image 406 is superimposed and displayed on the result display image 610. Thus, when the list image 406 and the result display image 610 are superimposed and displayed, the user can also select a selection item. Further, when the selected selection item is a selection item image (the specific selection item 1002 (see FIG. 10)) superimposed and displayed on the result display image 610, the display control device 150 displays the specific selection item 1002 and the result display image 610 so that the specific selection item 1002 and the result display image 610 are not superimposed. Thus, a selection item on which the result display image 610 is superimposed and displayed can also be clarified when the cursor 1000 gives an instruction. Accordingly, it is possible to inhibit erroneous selection of a selection item.

The display control device 150 according to the embodiment ends the display of the result display image 610 earlier than at the normal time when the result display image 610 is displayed on the HUD device and a manipulation on the list image 406 is accepted. Thus, since the display period of the result display image 610 can be shortened, the selection of a selection item by the user can be started quickly.

The display control device 150 according to the embodiment changes the display aspect of the second content image (the prompting image 600 and the result display image 610) when the vehicle detection image 1100 (see FIG. 11) indicating that another vehicle approaching the vehicle M is detected is displayed on the HUD device. Thus, when another vehicle becomes close, it is possible to cause the user not to focus on the second content image. Accordingly, the user can be allowed to concentrate on driving.

The display control device 150 according to the embodiment contracts and displays the second content image when the vehicle detection image 1100 is displayed. Thus, since the user can be caused to concentrate on the vehicle detection image 1100 which is being displayed, the user can be allowed to concentrate on driving.

Modified Example 1

Next, Modified Example 1 of the embodiment will be described. In the above-described embodiment, acceptance of a selection manipulation irrespective of whether a part of the list image 406 is superimposed and displayed on the result display image 610 (see FIG. 10(B) and step S1304 of FIG. 13). In Modified Example 1, non-acceptance of selection of a selection item (the specific selection item 1002) of a superimposed part when the part of the list image 406 is superimposed and displayed on the result display image 610 will be described.

In Modified Example 1, the input control unit 154 performs control such that the specific selection item 1002 illustrated in FIG. 10(A) is not instructed by the cursor 1000. For example, when a user performs a selection manipulation so that the specific selection item 1002 is instructed by the cursor 1000, the user may be notified that the specific selection item 1002 cannot be selected. This may be notified by a sound or may be displayed in the displayable region A1 of the HUD device.

Process During List Display According to Modified Example 1

Figure 14:
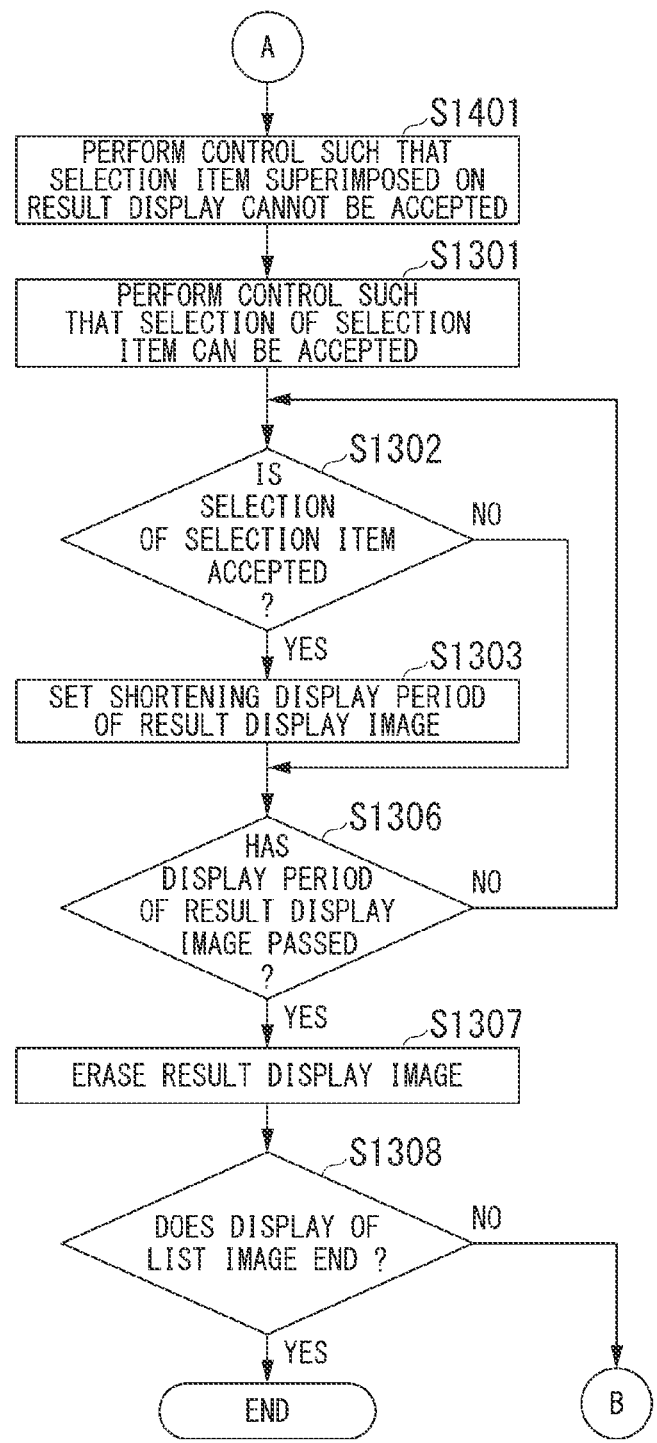
FIG. 14 is a flowchart illustrating Modified Example 1 of a process performed by the display control device 150 while a list is displayed.

FIG. 14 is a flowchart illustrating Modified Example 1 of a process performed by the display control device 150 while a list is displayed. The process performed during the list display in Modified Example 1 is different from the process during the list display in the embodiment in the process illustrated in FIG. 13. In description of FIG. 14, similar reference numerals are given to similar content to that of FIG. 13 are given and description thereof will be omitted.

In step S1401 of FIG. 14, the input control unit 154 performs control such that a selection item (the specific selection item 1002) on which the result display image 610 is superimposed cannot be accepted in the list image 406 (step S1401). Then, the input control unit 154 displays the cursor 1000 (see FIG. 10) and performs control such that selection of a selection item other than the specific selection item 1002 can be accepted (step S1402), and the process proceeds to step S1302. In Modified Example 1, since the specific selection item 1002 is not instructed by the cursor 1000, the processes of steps S1304 and S1305 illustrated in FIG. 13 can be caused not to be performed.

According to Modified Example 1, when a part of the list image 406 is superimposed and displayed on the result display image 610, the selection on the selection item in the superimposed part can be caused not to be accepted. In this way, by causing the selection item with low visibility not to be selectable, it is possible to inhibit erroneous selection of the selection item. Since the process of accepting selection of the specific selection item 1002 is not performed and the process of moving the display position of the specific selection item 1002 is not performed, it is possible to inhibit a load related to the control of the display.

In Modified Example 1, when a part of the list image 406 is superimposed and displayed on the result display image 610, only the selection item (the specific selection item 1002) of a part on which the result display image 610 is superimposed is caused not to be selected. However, the present invention is not limited thereto. When a part of the list image 406 is superimposed and displayed on the result display image 610, a manipulation of selecting all the selection items indicated in the list image 406 may be caused not to be accepted. Specifically, the input control unit 154 may perform control such that a manipulation of selecting all the selection items (a manipulation of the cursor 1000) is not accepted in the list image 406 illustrated in FIG. 10(A). In this way, it is possible to inhibit erroneous selection of a selection item and it is possible to inhibit a load related to the control of the display.

Modified Example 2

Next, Modified Example 2 of the embodiment will be described. In the above-described embodiment, the display of the first content image when the vehicle detection image 1100 is displayed has been described (see FIG. 11). In Modified Example 2, non-display of the first content image when the vehicle detection image 1100 is displayed will be described.

Figure 15:
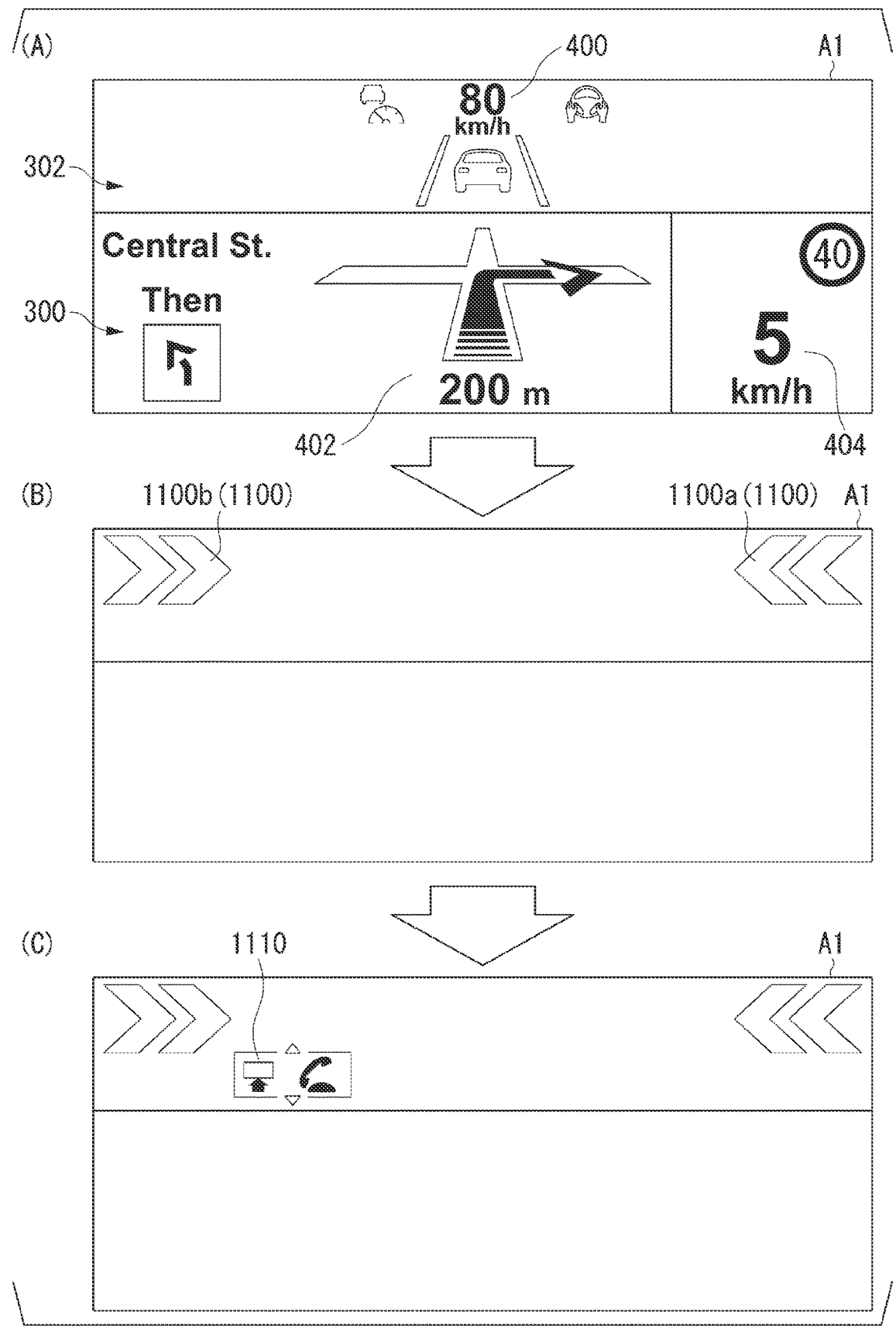
FIG. 15 is a diagram illustrating a display example of a content image according to Modified Example 2.

FIG. 15 is a diagram illustrating a display example of a content image according to Modified Example 2. As illustrated in FIG. 15(A), the navigation image 402 and the speed image 404 are displayed in the first display region 300 of the displayable region A1. The advanced driving support system image 400 is displayed in the second display region 302. It is assumed that another vehicle approaching the vehicle M is detected on a screen illustrated in FIG. 15(A). In this case, the screen transitions to a screen illustrated in FIG. 15(B).

As illustrated in FIG. 15(B), the vehicle detection image 1100 is displayed in the displayable region A1. When the vehicle detection image 1100 is displayed, the advanced driving support system image 400, the navigation image 402, and the speed image 404 of the first content image are not displayed.

It is assumed that a call is received on the screen illustrated in FIG. 15(B). In this case, the display control unit 152 changes the display aspect of the second content image and displays the second content image. For example, the display control unit 152 displays the call reception icon image 1110 in which the call reception image 604 is contracted, as illustrated in FIG. 15(C). When a predetermined manipulation is performed using the manipulation switch 130 on the screen illustrated in FIG. 15(C), the call reception image 604 in the normal display aspect may be displayed instead of the call reception icon image 1110.

According to Modified Example 2, the first content image is erased when the vehicle detection image 1100 is displayed. Thus, when another vehicle approaches, the user can be caused not to concentrate on the first content image. Accordingly, when another vehicle approaches, the user can further concentrate the driving.

In Modified Example 2, as illustrated in FIG. 15(B), the first content image is not displayed irrespective of the kind of first content image when the vehicle detection image 1100 is displayed. Here, the present invention is not limited thereto and the first content image may be displayed or may not be displayed in accordance with the kind of first content image. Specifically, for example, when the first content image is the first content image related to driving, the first content image may be displayed as it is. Conversely, when the first content image is the first content image (for example, the list image 406) unrelated to driving, the first content image may not be displayed. In this way, when another vehicle approaches, the user can cause to concentrate on driving.

Modified Example 3

Next, Modified Example 3 of the embodiment will be described. In the above-described Modified Example 2, the second content image (the call reception icon image 1110) which can be displayed when the vehicle detection image 1100 is displayed will be described (see FIG. 15(C)). In Modified Example 3, the second content image (the call reception icon image 1110) which is not displayed when the vehicle detection image 1100 is displayed will be described.

In Modified Example 3, for example, it is assumed that a call is received while the screen illustrated in FIG. 15(B) is being displayed. In this case, the display control unit 152 maintains the screen illustrated in FIG. 15(B), that is, does not display the call reception image 604 or the call reception icon image 1110. In this case, by notifying of call reception by a sound and allowing the user to manipulate the manipulation switch 130, a response may also be able to be made. In this case, call reception may be rejected and a partner may be notified of a driving situation in which a call cannot be performed.

In Modified Example 3, although a call is received when another vehicle approaches, the second content image (call reception) may not be displayed. According to Modified Example 3, when another vehicle approaches, the user can be caused to further concentrate on driving.

The embodiments for carrying out the present invention have been described above, but the present invention is not limited to the embodiments. Various modifications and substitutions can be made within the scope of the present invention without departing from the gist of the present invention.

What is claimed is:

1. A vehicle display device comprising:
a display control unit configured to display a first content image in a first display region on the basis of first information and display a second content image in a second display region on the basis of second information on a display unit on which an image is superimposed on an outside scenery so that the superimposed image is viewed,
wherein the display control unit changes a display aspect of the first content image on the basis of content of the second information when the first content image and the second content image are simultaneously displayed on the display unit,
wherein the display control unit changes a display aspect of the second content image when a detection image indicating that another vehicle approaching an own vehicle is detected is displayed on the display unit when the first content image and the second content image are simultaneously displayed on the display unit, and
wherein the display control unit contracts the second content image to display the second content image.

2. The vehicle display device according to claim 1, wherein the second content image includes a prompting image for urging a user to input a result and a result display image indicating the result input by the user, and
wherein the display control unit does not display the first content image when the prompting image is displayed on the display unit, and the display control unit displays the first content image on the display unit when the result display image is displayed on the display unit.

3. The vehicle display device according to claim 2, further comprising:
an input control unit configured to accept an input from the user,
wherein the input control unit does not accept the input of the prompting image from the user for a predetermined time after the prompting image is started.

4. The vehicle display device according to claim 2, further comprising:
an input control unit configured to accept an input from the user,
wherein the first content image includes a selection item image which is able to be selected by the user, and
wherein the input control unit continuously accepts a manipulation on the selection item image irrespective of whether the result display image is displayed on the display unit.

5. The vehicle display device according to claim 4, wherein the display control unit superimposes and displays the result display image and the selection item image at least partially when the result display image and the selection item image are displayed on the display unit.

6. The vehicle display device according to claim 5, wherein the input control unit accepts a manipulation on the selection item image irrespective of whether a part of the result display image is superimposed and displayed on the display unit, and
wherein the display control unit displays the selection item image and the result display image so that the selection item image and the result display image are not superimposed when the selection item image accepted by the input control unit is superimposed and displayed on the result display image.

7. The vehicle display device according to claim 4, wherein the display control unit ends the display of the result display image earlier than at a normal time when the result display image is displayed on the display unit and a manipulation on the selection item image is accepted.

8. The vehicle display device according to claim 5, wherein the input control unit does not accept a manipulation on the selection item image of the superimposed part when the superimposed part is displayed on the display unit.

9. The vehicle display device according to claim 1, wherein the display control unit does not display the first content image when detection information indicating that another vehicle approaching the own vehicle is detected is displayed on the display unit.

10. The vehicle display device according to claim 9, wherein the display control unit does not display the second content image.

11. A display control method performed using a computer mounted in a vehicle, the method comprising:
- displaying a first content image in a first display region on the basis of first information on a display unit on which an image is superimposed on an outside scenery so that the superimposed image is viewed;
- displaying a second content image in a second display region on the basis of second information on the display unit;
- changing a display aspect of the first content image on the basis of content of the second information when the first content image and the second content image are simultaneously displayed on the display unit;
- changing a display aspect of the second content image when a detection image indicating that another vehicle approaching an own vehicle is detected is displayed on the display unit when the first content image and the second content image are simultaneously displayed on the display unit; and
- contracting the second content image to display the second content image.

12. A computer-readable non-transitory storage medium that stores a program causing a computer mounted in a vehicle to perform:
- displaying a first content image in a first display region on the basis of first information on a display unit on which an image is superimposed on an outside scenery so that the superimposed image is viewed;
- displaying a second content image in a second display region on the basis of second information on the display unit;
- changing a display aspect of the first content image on the basis of content of the second information while the first content image and the second content image are simultaneously displayed on the display unit;
- changing a display aspect of the second content image when a detection image indicating that another vehicle approaching an own vehicle is detected is displayed on the display unit when the first content image and the second content image are simultaneously displayed on the display unit, and
- contracting the second content image to display the second content image.

* * * * *